(12) United States Patent
Kurahashi (10) Patent No.: US 9,329,029 B2
(45) Date of Patent: May 3, 2016

(54) METHOD OF MEASUREMENT AND APPARATUS

(75) Inventor: Yasuhiro Kurahashi, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 191 days.

(21) Appl. No.: 13/880,015

(22) PCT Filed: Oct. 27, 2011

(86) PCT No.: PCT/JP2011/074847
§ 371 (c)(1),
(2), (4) Date: Apr. 17, 2013

(87) PCT Pub. No.: WO2012/057280
PCT Pub. Date: May 3, 2012

(65) Prior Publication Data
US 2013/0208286 A1 Aug. 15, 2013

(30) Foreign Application Priority Data
Oct. 27, 2010 (JP) ................. 2010-241406

(51) Int. Cl.
*G01B 11/24* (2006.01)
*B23Q 17/24* (2006.01)
*G01B 11/04* (2006.01)
*B23Q 17/09* (2006.01)
*B23Q 17/22* (2006.01)
*B23Q 17/00* (2006.01)

(52) U.S. Cl.
CPC ............ *G01B 11/24* (2013.01); *B23Q 17/0914* (2013.01); *B23Q 17/22* (2013.01); *B23Q 17/2409* (2013.01); *B23Q 17/249* (2013.01); *G01B 11/04* (2013.01); *G01B 11/2433* (2013.01); *B23Q 2017/001* (2013.01)

(58) Field of Classification Search
CPC ............... G05B 19/40937; G05B 19/4097; G05B 19/41; G05B 19/4103; G01B 11/002; G01B 11/04; G01B 11/24; G01B 11/2433; G01S 17/42; G01S 7/4808; B23Q 1/44; B23Q 17/0914; B23Q 17/22; B23Q 17/2409; B23Q 17/249; B23Q 2017/001
See application file for complete search history.

(56) References Cited

U.S. PATENT DOCUMENTS

2004/0060663 A1 * 4/2004 Haraguchi ................. 156/349

FOREIGN PATENT DOCUMENTS

| CN | 101488017 A | 7/2009 |
|---|---|---|
| JP | 2-41856 | 2/1990 |

(Continued)

OTHER PUBLICATIONS

International Search Report mailed Jan. 24, 2012, directed to International Application No. PCT/JP2011/074847; 8 pages.

*Primary Examiner* — Edward Park
(74) *Attorney, Agent, or Firm* — Morrison & Foerster LLP (57) ABSTRACT

In the machine tool (10) pertaining to the present invention, an imaging device (33) takes an image of a tool (20) being moved in the feeding direction. Contour lines (51) are identified by means of the plurality of sets of image data generated from imaging. The movement trajectory (52) and the central axis (53) of the tool (20) are identified on the basis of the contour lines (51). When the movement trajectory (52) and the central axis (53) are offset, said offset can be used to correct the positioning of the tool (20) with the machine tool (10). As a result, the processing accuracy of a workpiece improves. Moreover, when the dimensions of a tool (20) that has a tilted posture are measured, it is possible to determine the actual tool diameter or the actual blade position in the tilted posture. The aforementioned blade position and tool diameter can be used to correct the positioning of the machine tool (10). Thus, the processing accuracy of the workpiece improves even more.

5 Claims, 7 Drawing Sheets

(56) References Cited

FOREIGN PATENT DOCUMENTS

| JP | 10-138100 | 5/1998 | |
|----|-----------|--------|---|
| JP | 2005-324300 | 11/2005 | |
| JP | 2006-113822 | 4/2006 | |
| JP | 2010-019559 | * | 1/2010 |
| JP | 2010-19559 | | 1/2010 |
| JP | 2010019559 A | * | 1/2010 |

* cited by examiner

METHOD OF MEASUREMENT AND APPARATUS

REFERENCE TO RELATED APPLICATIONS

This application is the national stage application under 35 USC 371 of International Application No. PCT/JP2011/074847, filed Oct. 27, 2011, which claims the priority of Japanese Patent Application No. 2010-241406, filed Oct. 27, 2010, the entire contents of which are incorporated herein by reference.

FIELD OF THE INVENTION

The present invention relates to, for example, a method and apparatus which measure the cutting edge position, tool length, tool size, cutting edge shape, tool run-out, or other tool dimensions of a tool which is used in a CNC (computer numerical control) machine tool and to a machine tool.

BACKGROUND OF THE INVENTION

For example, in an NC machine tool, at the time of working a workpiece, a tool such as a drill bit or end mill which is attached to a spindle rotates while contacting the workpiece. The tool is fed in a predetermined feed direction in the NC machine tool. In improvement of the working precision of the workpiece, it is considered necessary to specify the center axis of the tool, which determines the center of rotation of the tool or the posture of the tool, and to set the tool to a desired posture.
PLT 1: Japanese Patent Publication No. 2005-324300A

SUMMARY OF THE INVENTION

Technical Problem

For example, PLT 1 discloses a method of capturing an image of a shape of a tool which is attached to a spindle so as to measure the shape of the tool. With this method, the shape of a tool which is positioned at a predetermined position is measured. Therefore, it is not possible to measure offset between a center axial line of the tool and the feed direction. If such offset occurs, the working precision of the workpiece ends up falling.

The present invention was made in consideration of the above situation and has as its object the provision of a method of measurement and an apparatus for measurement of tool dimensions which can measure tool dimensions by a posture and movement path of the tool which is used in the working operation, which can further confirm in advance an offset between a coordinate system of the machine tool and a coordinate system of the measurement apparatus, and which can improve the working precision of the workpiece even more, and of a machine tool using the same.

Solution to Problem

To achieve the above object, according to the present invention, there is provided a method of measurement of tool dimensions which uses an image capture device which moves relative to a tool so as to capture an image of the tool and which uses the obtained image data to measure the dimensions of the tool, the method of measurement of tool dimensions, comprising the steps of capturing an image of the tool which moves along a predetermined feed direction by the image capture device at a plurality of positions and reading out a plurality of image data which are generated at the positions of the movement and specifying the contour of the tool at each of the plurality of the image data and using the specified plurality of contours as the basis to specify the movement path of the tool and the center axial line of the tool.

With this method of measurement of tool dimensions, the movement path of the tool may be specified by calculating the trend in the positions of a reference point, which has a predetermined positional relationship with the contour of the tool, on the plurality of the image data. The center axial line of the tool may be specified by calculating the average of a reference line, which has a predetermined positional relationship with the contour of the tool, on the plurality of the image data.

Such a method of measurement of tool dimensions may be further provided with a step of using the specified movement path and center axial line of the tool as the basis to specify at least one of a cutting edge position and tool size of the tool using the contour of the tool.

According to the present invention, there is provided an apparatus for measurement of tool dimensions which captures an image of a tool and uses the obtained image data to measure the dimensions of the tool, the apparatus for measurement of tool dimensions comprising an image capture device which captures an image of the tool which moves along a predetermined feed direction at a plurality of positions to generate a plurality of image data of the positions of the movement, and a processing device which specifies contour of the tool at each of the plurality of image data and uses the specified plurality of contours as the basis to specify a movement path of the tool and a center axial line of the tool.

According to the present invention, there is provided a machine tool which captures an image of a tool which is mounted on a spindle and uses the obtained image data to measure dimensions of the tool on the machine, comprising an image capture device which captures an image of the tool which moves relatively along a predetermined feed direction at a plurality of positions to generate a plurality of image data of the positions of the movement, and a processing device which specifies the contour of the tool at each of the plurality of image data and uses the specified plurality of contours as the basis to specify a movement path of the tool and a center axial line of the tool, and which uses the specified movement path of the tool as the basis to specify offset between a planar coordinate system of two perpendicular axes which are set in a machine tool and a planar coordinate system of two perpendicular axes which is set in a field of view of the image capture device and is linked with the planar coordinate system of the machine tool and controlling them so as to correct offset.

According to the present invention, it is possible to provide a method of measurement and an apparatus for measurement which enable the working precision of a workpiece to be improved much more and a machine tool using the same. It measures the angle formed by the movement path and the center axial line of the tool, that is, the relative angle, so can measure this angle without regard as to mounting error of an image capture device with respect to a machine tool. In the case of work where the center axial line of the tool is made to match the direction of the movement path of this tool, the NC device may be corrected so that this angle becomes zero. If working the workpiece by the vicinity of the vertex on the center axial line of the ball end mill, the peripheral speed of the cutting edge is small and the worked surface falls in quality. To solve this problem, the center axial line of the ball end mill is tilted with respect to the workpiece and the workpiece is worked by the part of the cutting edge with a large peripheral speed away from the vertex. At this time, whether the angle which is formed between the movement path of the tool and the center axial line has become a desired angle is measured. If not, the NC device may be corrected. In particular, a five-axis machine tool which has three perpendicular linear feed axes and two rotary feed axes enables the posture of the tool with respect to the workpiece to be changed, so correction is easy.

Further, according to the present invention, since it is possible to specify the movement path of the tool, it is possible to find the error in the movement path of the NC device, that is, the offset of the coordinate axes of the field of view of the measurement apparatus and the coordinate axes of the machine tool, and possible to correct this offset so as to match the measurement results of the tool dimensions with the coordinate system of the machine tool.

DETAILED DESCRIPTION OF THE INVENTION

Below, embodiments of the present invention will be explained with reference to the drawings.

Figure 1:
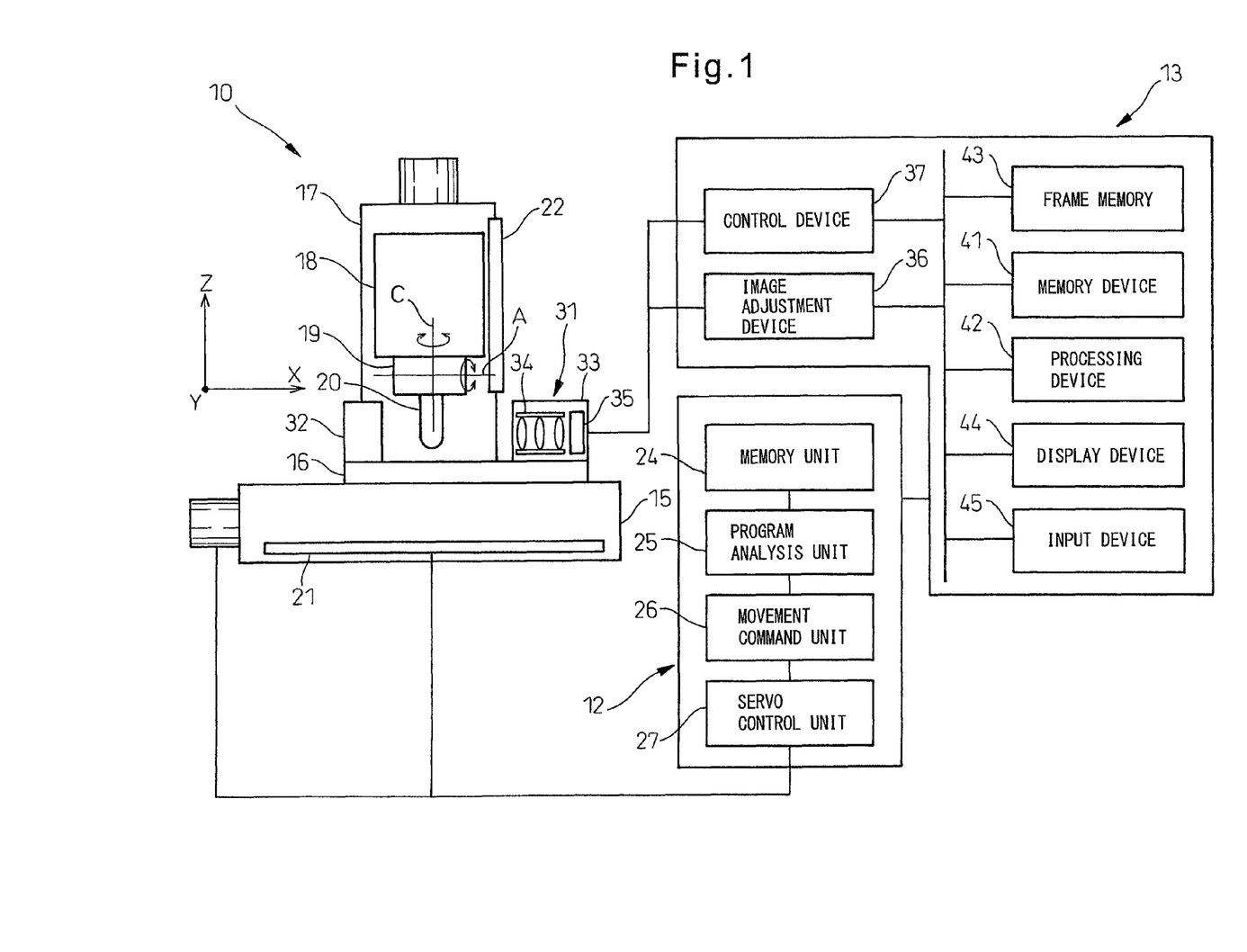
FIG. 1 is a view which schematically shows the configuration of a machine tool according to one embodiment of the present invention.

FIG. 1 is a view which schematically shows the configuration of a machine tool 100 according to one embodiment of the present invention. This machine tool 10 is provided with, not only mechanical parts which perform work on a workpiece (not shown), but also an NC device 12 which controls operation of the machine tool 10 and a dimension measurement apparatus 13 which is connected to the machine tool 10 and the NC device 12 and which measures the dimensions of a tool of a machine tool 10. For the machine tool 10, for example, a five-axis vertical machining center is used. In the present embodiment, the dimension measurement apparatus 13 is shown separate from the NC device 12, but the dimension measurement apparatus 13 may also for example be assembled inside of the NC device 12.

First, the mechanical configuration of the machine tool 10 will be explained. The machine tool 10 is set with an XYZ perpendicular three-axis reference coordinate system. The machine tool 10 is provided with a bed 15 which extends along a horizontal surface, that is, an XY plane, a table base 16 which is arranged on the bed 15, and a column 17 which rises from the bed 15 at the rear of the table base 16 in the vertical direction parallel to the Z-axis. A workpiece (not shown) is fastened on the table base 16. A spindle head 18 is supported on the column 17. At the bottom end of the spindle head 18, a tool 20 is attached facing downward via the spindle 19 in a detachable manner. The tool 20 is driven to rotate by a spindle motor (not shown) which is assembled inside the spindle 19. Here, for the tool 20, for example, a ball end mill is used.

In addition, the spindle head 18 is attached to the spindle stock (not shown) to be able to turn about an axial line parallel to the X-axis through an A-axis rotary feed mechanism. At the same time, the spindle head 18 is attached to the spindle stock to be able to turn about an axial line parallel to the Z-axis through a C-axis rotary feed mechanism. The rotary feed mechanism is, for example, comprised of a direct drive motor or servo motor. The spindle head 18 has built into it rotational angle detectors (not shown) which detect the rotational angles in the A-axis and C-axis rotational directions. The rotational angles which are read by these rotational angle detectors are output, that is, are fed back, to the NC device 12.

The table base 16 is supported on the bed 15 to be able to move in the horizontal direction (X-axial direction) through a linear feed mechanism. On the other hand, the spindle head 18 is supported at the column 17 to be able to move in the vertical direction (Z-axial direction) and horizontal direction (Y-axial direction) through linear feed mechanisms. The linear feed mechanisms are, for example, provided with ball screws and servo motors which drive rotation of the ball screws. Note that, instead of the Y-axial direction movement of the spindle head 18, the table base 16 may move in the Y-axial direction. Further, instead of a configuration where the spindle head 18 has an A-axis and C-axis, the configuration may be made one where the table base 16 has an A-axis and C-axis.

The bed 15 has built into it an X-axial position detector 21 which reads the relative position between the bed 15 and the table base 16 along the X-axis. The column 17 has built into it a Y-axial position detector (not shown) and a Z-axial position detector 22 which read the relative positions between the column 17 and the spindle head 18 along the Y-axis and the Z-axis. For these position detectors, for example, digital scales may be used. The relative positions which are read by these position detectors are specified by the coordinate values of the reference coordinate system. The read coordinate values are output, that is, are fed back, to the NC device 12.

The above-mentioned rotary feed mechanisms and linear feed mechanisms are used to realize relative movement between the table base 16 and the tool 20. The relative movement is realized based on later explained drive signals which are supplied from the NC device 12. The tool 20 which rotates during relative movement contacts the workpiece at a predetermined working point. In this way, the workpiece is worked to a desired shape.

Next, the configuration of the NC device 12 will be explained. The NC device 12 is provided with a memory unit 24 which stores an NC program, a program analysis unit 25 which analyzes the NC program which is stored in the memory unit 24, a movement command unit 26 which generates movement commands in accordance with the NC program which was analyzed by the program analysis unit 25, and a servo control unit 27 which outputs drive signals to the servo motors of the machine tool 10 in accordance with movement commands which are output from the movement command unit 26. The movement commands include, for example, indexing data of the working point of the workpiece and coordinate value data which shows the position of the spindle 19 corresponding to a working point after indexing.

Next, the configuration of the dimension measurement apparatus 13 will be explained. The dimension measurement apparatus 13 is provided with a dimension measurement unit 31 which is arranged on the table base 16. The dimension measurement unit 31 is provided with a light source 32 and an image capture device 33 which faces the light source 32. For the light source 32, for example, a high luminance LED which outputs parallel light toward the image capture device 33 is used. The image capture device 33 is provided with a lens unit 34 and CCD (charge coupled device) image sensor 35. The CCD image sensor 35 is, for example, a 2D image sensor.

The dimension measurement apparatus 13 is provided with an image adjustment device 36 which receives image data of a captured image from the image capture device 33 and a control device 37 which controls the operation of a light source device 32 and image capture device 33. The above-mentioned CCD image sensor 35 outputs an analog image signal corresponding to an image which is formed on the light receiving surface at, for example, a frame rate of 30 to 60 frames per second. The analog image signal is converted to digital image data by an A/D converter which is built into the image capture device 33 and is output to the image adjustment device 36.

The image adjustment device 36 performs shading correction, noise reduction, white balance adjustment, contour correction, contrast adjustment, and other image adjustment processing and binarizes the digital image data. The image adjustment device 36 stores the image data after image adjustment in the later explained frame memory. On the other hand, the control device 37 outputs a drive signal which controls movement or zoom of the image capture device 33 to the image capture device 33. Note that, in the field of view of the image capture device 33, an xy perpendicular 2-axis field-of-view coordinate system is set corresponding to the YZ plane of the above-mentioned reference coordinate system. The coordinate values of this field-of-view coordinate system are linked with the coordinate values of the reference coordinate system in each field of view of the positions after movement of the image capture device 33 in the YZ plane.

The dimension measurement apparatus 13 is provided with a memory device 41 which stores the dimension measurement program and tool data, a processing device 42 which performs various processing based on the dimension measurement program, and a frame memory 43 which stores the image data for each frame. In the processing, the dimension measurement program may be read out temporarily to a memory (not shown). Details of the dimension measurement program and tool data will be explained later. Note that, the dimension measurement program may, for example, be read from a FD (floppy disk) or CD-ROM or other portable memory medium to the memory device 41 or may be downloaded from a LAN or Internet or other such computer network to the memory device 41.

The dimension measurement apparatus 13 is, for example, provided with a display device 44 which has a display screen which shows information of two brightness values for each pixel forming the image data which shows the image (silhouette) of a tool or coordinate values of the pixels and an input device 45 which, for example, inputs an instruction to the processing device 42 by designation of a predetermined position on the display screen. The display device 44 may, for example, be a LCD (liquid crystal display) panel or other flat display panel, while the input device 45 may, for example, be a touch panel or a keyboard, mouse, etc. A user, for example, can use a touch panel or a mouse to designate the direction of a contour line of the tool 20 on the image which is displayed on the display screen of the display device 44 or designate a measurement position on a contour line of the tool 20.

Next, the method of measurement of the dimensions of the tool 20 by the machine tool 10 according to the present invention will be explained. Here, for example, the movement path of the tool 20 and the center axial line of the tool 20 are measured. The movement path of the tool 20 is the path of the movement of the tool 20 which is sent in a predetermined feed direction by the linear feed mechanism. The center axial line of the tool 20 is the center axial line of the tool 20 which matches with the center of rotation of the spindle 19. In performing the processing for measurement of the dimensions of the tool 20, the processing device 42 of the dimension measurement apparatus 13 reads out the dimension measurement program from the memory device 41 to, for example, the memory. In this way, the processing device 42 performs various processing based on the dimension measurement program.

First, the processing device 42 outputs a start signal to the NC device 12. In response to receipt of the start signal, the NC device 12 outputs a drive command toward the machine tool 10. As a result, in the machine tool 10, the spindle 19 is positioned on the XY plane at a predetermined position between the light source 32 and the image capture device 33. At the same time, the spindle 19 is, for example, positioned at a position of any rotational angle in the A-axial direction. In this way, the center axial line of the tool 20 perpendicularly intersects the Y-axis and the Z-axis on the YZ perpendicular two-axis planar coordinate system of the reference coordinate system. In this way, the tool 20 is set to a slanted posture. Here, the rotational angle is, for example, set to an angle by which the center axial line of the tool 20 rotates from a state parallel to the Z-axis toward a horizontal plane across 45 degrees in the A-axial direction. At this time, the tool 20 is driven to rotate about this center of rotation.

At the same time, the processing device 42 outputs a start signal to the control device 37 for starting the operation of the light source 32 and image capture device 33. In response to receipt of the start signal, the control device 37 outputs a drive signal for driving the image capture device 33. In this way, the image capture device 33 starts image capture. The image capture device 33 generates an analog image signal for each frame captured. The image data which is generated from this image signal is stored through the image adjustment device 36 in the frame memory 43 for each frame. Details of the image data will be explained later.

The tool 20 is made to move in a 45 degree feed direction based on the Y-axial direction linear movement and the Z-axial direction linear movement. The speed of the Y-axial direction linear movement and the speed of the Z-axial direction linear movement are set equal. That is, in setting the machine tool 10, the A-axial direction rotational angle of the tool 20 and the feed direction angle of the tool 20 are set the same. Therefore, the movement path of the tool 20 is set to a direction which perpendicularly intersects the Y-axis and the Z-axis of the reference coordinate system which is set at the machine tool 10. If the tool 20 enters the field of view of the image capture device 33, image data is output for each frame capturing the tool 20 at each position during movement in the set feed direction. Note that, the movement of the tool 20 is stopped at the point of time when the tool 20 moves inside the field of view over a predetermined distance. The distance may be freely set.

Figure 2:
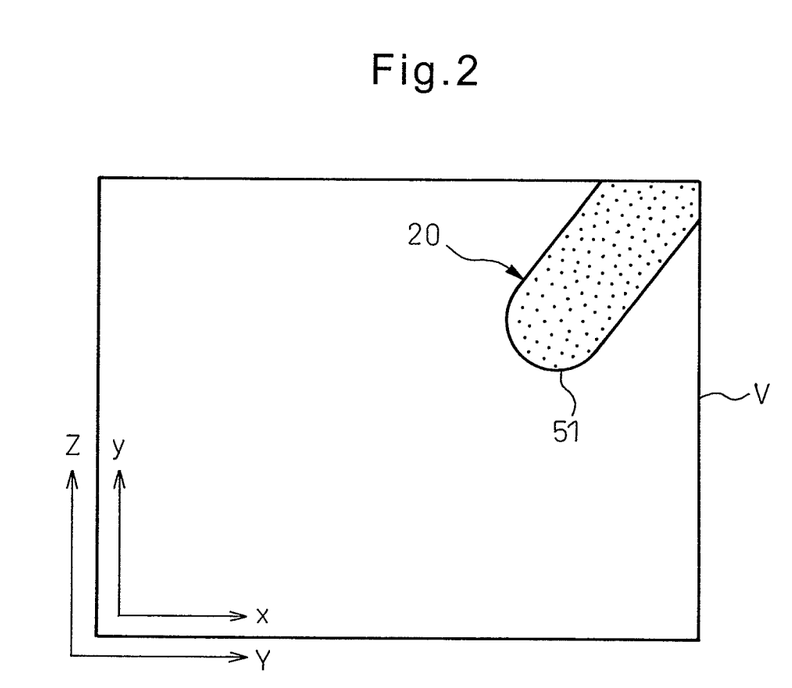
FIG. 2 is a view which shows image data according to a specific example.

At the light receiving surface of the CCD image sensor 35, an image of a projection of a shadow of the tool 20 is formed by parallel light which is emitted from the light source 32. The image data is comprised of a large number of pixels which specify an image inside of the field of view. As explained above, in the image data, two brightness values are specified for each pixel, so, for example, as shown in FIG. 2, in the field of view V specified by the image data, the dark pixels are specified as projected parts of the shadow of the tool 20, while the bright pixels are specified as parts receiving the parallel light. In this way, the contour of the tool 20 is specified.

Figure 3:
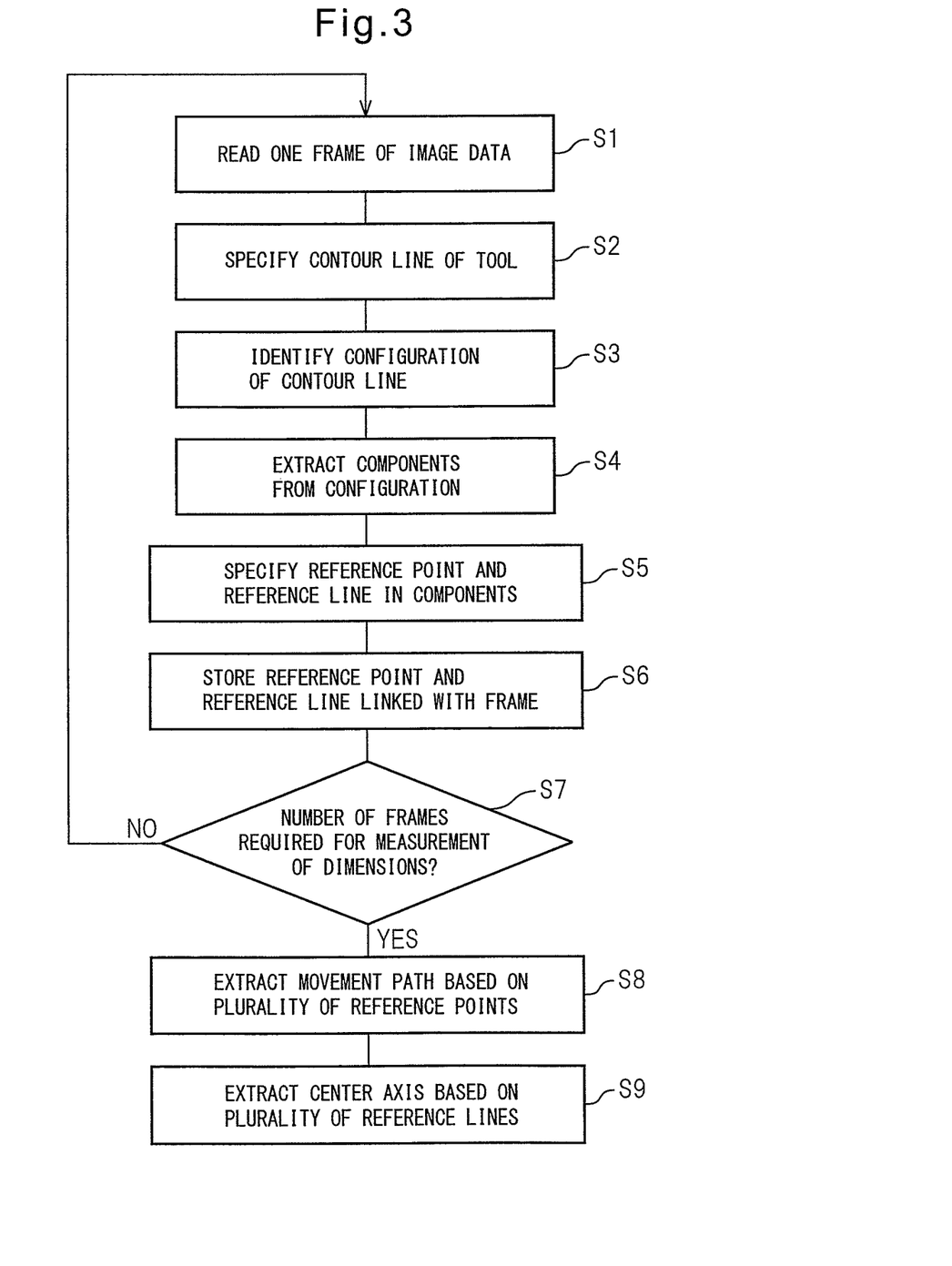
FIG. 3 is a flow chart which shows a flow of processing of a method of measurement of tool dimensions according to one embodiment of the present invention.

FIG. 3 is a flow chart which shows the flow of processing of the method of measurement of the dimensions of the tool 20 according to one embodiment of the present invention. At step S1, the processing device 42 reads out one frame of image data from the frame memory 43. Here, image data in which the majority of the contour of the tool 20 enters the field of view V is read out. Based on the read out image data, at step S2, the processing device 42 detects the edge of the contour of the tool 20. As explained above, the pixels are shown by two brightness values, so the edge is specified by dark pixels which adjoin bright pixels among the dark pixels which correspond to pixels of the image of the tool 20 in the field of view of the image. In this way, as clear from FIG. 2, at step S3, the processing device 42 specifies a contour line 51 of the tool 20 based on the extraction of a continuous plurality of dark pixels adjoining bright pixels. The contour line 51 is, for example, specified by a recurrence curve.

Figure 4:
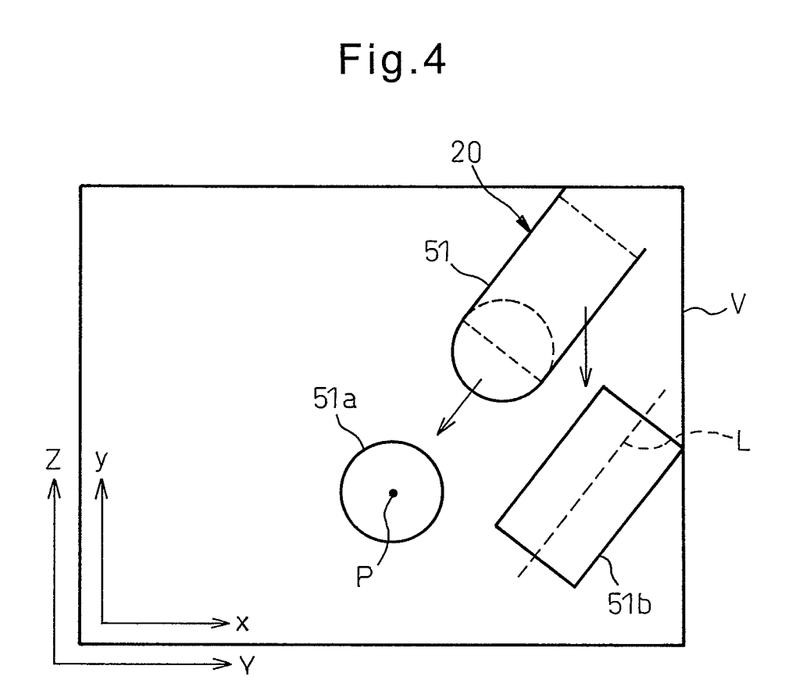
FIG. 4 is a view which shows image data according to another specific example.

Next, the processing device 42 identifies the configuration of the contour line 51 at step S3. The tool 20 is a ball end mill, so, as shown in FIG. 4, for example, a circle 51a which is defined by the front end of the tool 20 and a rectangular shape 51b which is connected to the rear end of the circle 51a are identified. At step S4, in identification of the circle 51a, it is sufficient that a semicircular component of the front end of the tool 20 be specified from the shape of the contour line 51. In the specification of a rectangular shape 51b, it is sufficient that the parallel components (possibly including shank) be specified from the shape of the contour line 51. At step S5, the processing device 42 specifies a reference point which has a predetermined positional relationship with the circle 51a from the semicircular component of the circle 51a. Here, the reference point is the center point P of the circle 51a. At the same time, the processing device 42 specifies a reference line which has a predetermined positional relationship with the rectangular shape 51b from the parallel components of the rectangular shape 51b. Here, the reference line is the axial line L of the rectangular shape 51b which extends in the longitudinal direction of the rectangular shape 51b.

As explained above, inside the field of view V of the image capture device 33, a field-of-view coordinate system is defined, so the coordinate values in the field-of-view coordinate system of the pixels which form the circle 51a, center point P, rectangular shape 51b, and axial line L are specified. Here, the axial line L is converted to a numerical formula based on the coordinate values which specify the rectangular shape 51b. In this way, the image data with specified coordinate values is stored in the frame memory 43 at step S6. The coordinate value data which shows the coordinate values of the field-of-view coordinate system of the circle 51a, center point P, rectangular shape 51b, and axial line L may be stored in the frame memory 43 linked with the image data. In this way, the processing of steps S1 to S6 is completed.

Next, at step S7, it is judged if the number of frames which have finished being processed has reached the number of frames which are required for measurement of the dimensions. The number of frames which are required for measurement may be freely set. For measuring the dimensions of a tool 20, that is, the movement path and center axial line, a plurality of frames is considered necessary, so the processing of the processing device 42 returns to step S1. Note that, the number of frames which are required in the present embodiment is, for example, set to 4. The processing device 42 repeats the processing from steps S1 to S6 for each frame. The tool 20 moves in the feed direction, so the position of the contour line 51 of the tool 20 changes with each frame. In this way, when the number of frames finished being processing reaches the number of frames required for measurement of the dimensions, the processing of the processing device 42 proceeds to step S8. Note that, when the movement path of the tool is straight, the necessary number of frames is the minimum 2, when the movement path is an arc, the necessary number of frames is the minimum 3, and when the movement path is any other, the necessary number of frames is the minimum 4. In either case, the larger the number of frames, the higher the measurement precision, but this is set in advance in accordance with the working conditions.

Figure 5:
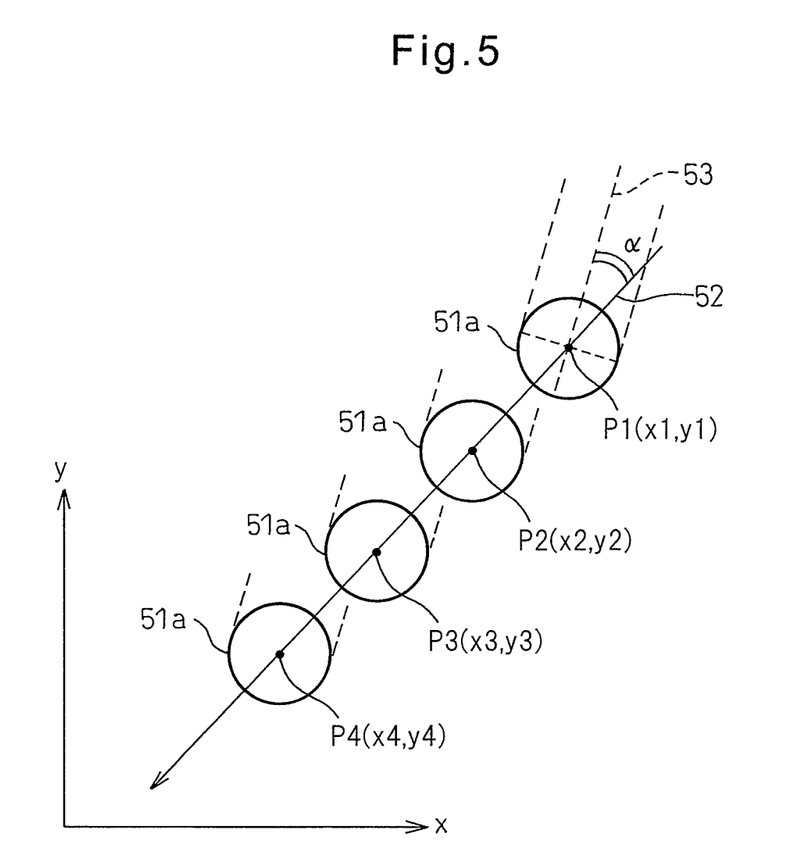
FIG. 5 is a view which schematically shows processing which specifies a movement path and center axial line of a tool.

At step S8, the trend in the positions of the plurality of center points P specified for each plurality of frames is used as the basis to calculate the movement path of the tool 20. As shown in FIG. 5, circles 51a which are specified for each frame are arranged based on the field-of-view coordinate system, and the coordinate values (xn, yn) of the center points Pn are specified. A recurrence curve which passes through all of the specified center points P is calculated. In this way, the calculated recurrence curve corresponds to the movement path 52 of the tool 20. Next, at step S9, the average of the plurality of center axial lines L which are specified by the plurality of frames are used as the basis to calculate the axial line of the tool 20. Specifically, a recurrence curve of an average of the plurality of center axial lines L is calculated. As shown in FIG. 5, the calculated recurrence curve corresponds to the center axial line 53 of the tool 20. The calculated tool data which specifies the movement path 52 and center axial line 53 are stored in the memory device 41. In the tool data, the coordinate values may be specified by conversion from the field-of-view coordinate system to coordinate values of the reference coordinate system.

As clear from FIG. 5, in the example of the present embodiment, the movement path 52 and center axial line 53 of the tool 20 do not match. The movement path 52 and the center axial line 53, for example, intersect by an intersection angle α. Here, if predicated on the angle of the movement path 52, that is, the angle of the feed direction, being 45 degrees as set, it is learned that the position of the rotational angle of the spindle 19 is off from 45 degrees of the setting. This offset ends up remarkably lowering the working precision of the workpiece. Therefore, the calculated intersection angle α may be used for mechanical correction of the rotational angle of the A-axial direction of the machine tool 10 or may be used for correction of the coordinate values for control of the position of the spindle 19 by the NC device 12. In this way, in the machine tool 10, it is sufficient that correction be performed so that the center axial line 53 and the movement path 52 match. Note that, when, as a result of measurement of the dimensions, the movement path 52 and the center axial line 53 match, this shows that the position of the rotational angle of the spindle 19 is as set.

Figure 6:
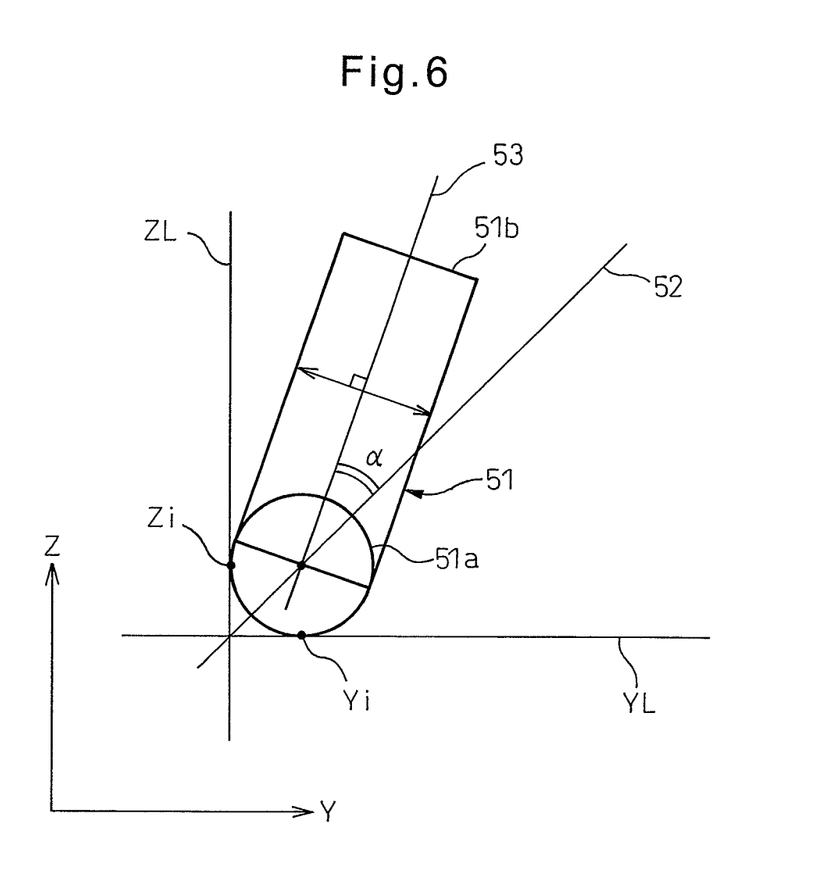
FIG. 6 is a view which schematically shows processing which specifies a tool size or cutting edge position etc. of a tool.

In addition to the above measurement, in the dimension measurement apparatus 13, the tool size and cutting edge position of the slanted posture tool 20 may also be measured. The processing device 24, in the same way as above, uses the image data as the basis to specify components of the circle 51a and rectangular shape 51b from the contour line 51. At this time, as shown in FIG. 6, for example, the tool size of the tool 20 may be measured in a direction perpendicularly intersecting the center axial line 53. Further, the contact point Yi between the imaginary line YL which is parallel with the Y-axis of the reference coordinate system and the circle 51a may be measured as the cutting edge position of the tool 20 in accordance with the relative positional relationship of the tool 20 and the workpiece. On the other hand, the contact point Zi between the imaginary line ZL which is parallel with the Z-axis of the reference coordinate system and the circle 51a may be measured as the cutting edge position of the tool 20.

The tool length of the tool 20 may be calculated from the cutting edge position. In measurement of the tool size or cutting edge position, the measurement position on the contour line 51 of the tool 20 may be set in advance by dimension measurement software. As a result, the dimensions of the tool 20 can be measured automatically.

In the above way, according to the machine tool 10 according to the present embodiment, the image capture device 33 captures an image of the tool 20 during movement in the feed direction. The plurality of image data which is generated by image capture is used to specify the contour line of the tool 20. The contour line 51 is used as the basis to specify the movement path 52 and center axial line 53. If there is offset between the movement path 52 and the center axial line 53, this offset can be used for correction of the positioning of the tool 20 at the machine tool 10. As a result, the working precision of the workpiece is improved. Further, for example, if the dimensions of the slanted posture tool 20 are measured, the actual cutting edge position at the slanted posture and the tool size can be specified. The cutting edge position and tool size can be used for correction of the positioning of the machine tool 10. As a result, the working precision of the workpiece is further improved.

In such a machine tool 10, the user may manually designate the measurement position of the tool size or cutting edge position of the tool 20. Based on the image data, the contour line 51 is displayed on the display screen of the display device 44. On the display screen, for example, the measurement position on the contour line 51 may be displayed as an option. The user may specifically designate any measurement position on the contour line 51. The measurement position may be designated, for example, on the display screen by a mouse. The measurement position is also designated by the contact position on the touch panel. In this way, in the same way as explained above, the processing device 42 can measure dimensions of the tool 20 including the tool size or cutting edge position, tool length, etc. in accordance with the designated measurement position.

Figure 7:
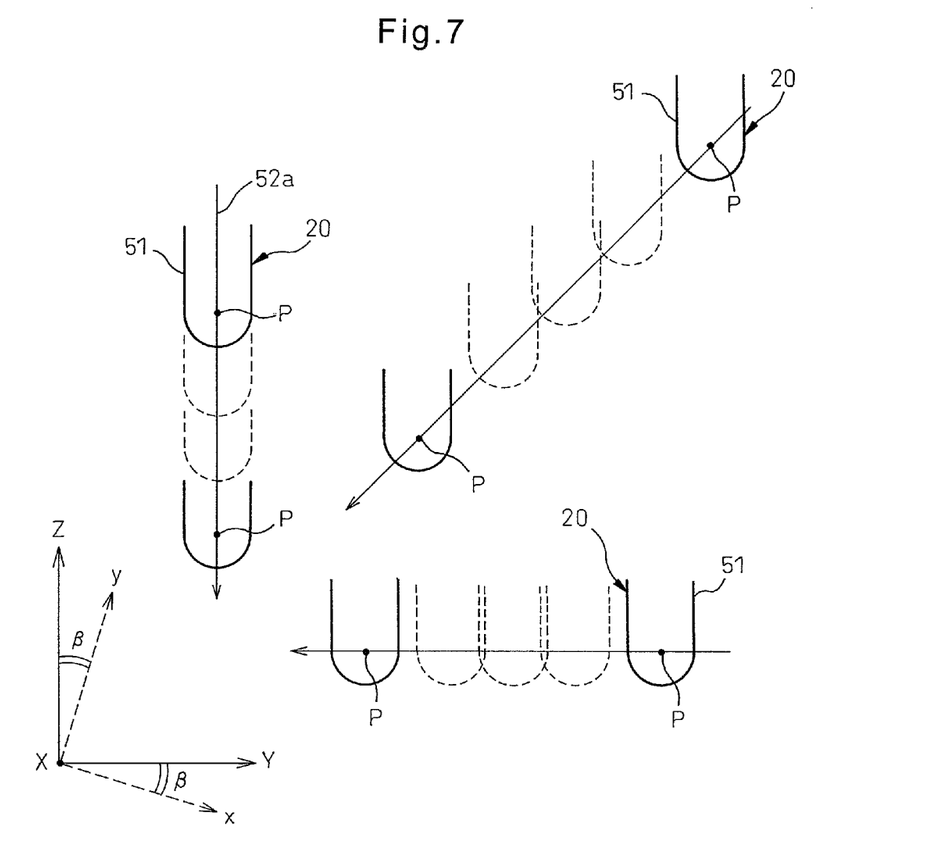
FIG. 7 is a view which schematically shows processing which specifies offset of a coordinate system.

Next, the processing for specifying the offset of the reference coordinate system of the machine tool 10 and the field-of-view coordinate system of the image capture device 33 will be explained. For example, as shown in FIG. 7, in the machine tool 10, the tool 20 is made to move in a feed direction parallel to the Z-axis of the reference coordinate system. In the image capture device 33, a movement path 52*a* parallel to the Z-axis is specified. At this time, if the image capture device 33 is accurately positioned with respect to the table base 16, the movement path 52*a* is prescribed in parallel to the y-axis of the field-of-view coordinate system. As a result, the processing device 42 judges that no offset has occurred between the reference coordinate system and the field-of-view coordinate system. Note that, here the right angle in the machine tool 10 is in the allowable range.

On the other hand, as shown in FIG. 7, if the field-of-view coordinate system is offset by a predetermined rotational angle about the X-axis of the reference coordinate system, the moving field of view 52*a* is specified as not parallel with the y-axis of the field-of-view coordinate system. That is, the movement path 52*a* intersects the y-axis of the field-of-view coordinate system by a predetermined intersection angle. This intersection angle matches the rotational angle $\beta$ of the field-of-view coordinate system which is defined about the X-axis of the reference coordinate system. The processing device 42 judges that offset has occurred between the reference coordinate system and the field-of-view coordinate system by exactly the amount of the rotational angle $\beta$. At this time, in the machine tool 10, the specified rotational angle $\beta$ may be used as the basis to adjust the mechanical attachment position of the image capture device 33 on the table base 16. Note that, instead of adjustment of the mechanical attachment position, the specified rotational angle $\beta$ may be used as the basis to, for example, correct the coordinate values between the NC device 12 and the dimension measurement apparatus 13.

Further, in specifying the offset between the reference coordinate system and the field-of-view coordinate system, in the machine tool 10, the tool 20 may be made to move in a feed direction parallel to the Y-axis. In the image capture device 33, a movement path 52*b* parallel to the Y-axial direction of the reference coordinate system is specified. The angle of intersection of this movement path 52*b* and x-axis may be used as the basis to specify the rotational angle $\beta$ in the same way as above. In the same way, in specifying either the reference coordinate system or the field-of-view coordinate system, the tool 20 may be made to move in a feed direction which intersects the Y-axis and the Z-axis. In the image capture device 33, the movement path 52*c* of the direction perpendicularly intersecting the Y-axis and the Z-axis of the reference coordinate system is specified. At this time, the angle of the feed direction and the angle of the movement path 52*c* on the field of view of the image capture device 33 may be compared. It is also possible to use this movement path 52*c* as the basis to specify the rotational angle $\beta$ in the same way as above.

In the above way, the offset between the reference coordinate system of the machine tool 10 and the field-of-view coordinate system of the image capture device 33 is specified based on the movement path 52*a* to 52*c* of the tool 20. If the offset of the reference coordinate system and the field-of-view coordinate system is specified in this way, the image capture device 33 can be arranged at an accurate position with respect to the machine tool 10. As a result, the image capture device 33 can accurately measure the dimensions of the tool 20. Therefore, the offset which was calculated based on measurement of the dimensions can be used accurately for correction of the positioning of the machine tool 10. The working precision of the workpiece is therefore improved.

In the above embodiments, the method of measurement and the apparatus for measurement of the tool dimensions of the present invention were explained using a vertical machining center as an example of the machine tool 10, but the method of measurement and the apparatus for measurement of tool dimensions of the present invention can also be realized by, for example, a horizontal machining center or other machine tool. Further, the method of measurement and the apparatus for measurement of tool dimensions of the present invention were explained using a ball end mill as an example of a tool 20, but the method of measurement and the apparatus for measurement of tool dimensions of the present invention can also be realized, for example, for a flat end mill or drill bit or other tool.

The invention claimed is:

1. A method of measurement of tool dimensions which uses an image capture device which moves relative to a tool so as to capture an image of said tool and which uses the obtained image data to measure the dimensions of said tool, the method of measurement of tool dimensions comprising the steps of:

capturing an image of said tool which moves along a predetermined feed direction by said image capture device at a plurality of positions and reading out a plurality of image data which are generated at the positions of said movement;

specifying a contour of said tool at each of the plurality of said image data and using the specified plurality of contours as a basis to specify an angle α between a movement path of said tool and a center axial line of said tool; and specifying, based on the movement path, an angle β between a planar coordinate system of two perpendicular axes which is set in a machine tool and a planar coordinate system of two perpendicular axes which is set in a field of view of said image capture device and is linked with the planar coordinate system of the machine tool.

2. The method of measurement of tool dimensions according to claim 1, wherein said movement path of the tool is specified by calculating the trend in the positions of a reference point, which has a predetermined positional relationship with the contour of said tool, on the plurality of said image data.

3. The method of measurement of tool dimensions according to claim 1, wherein said center axial line of the tool is specified by calculating the average of a reference line, which has a predetermined positional relationship with the contour of said tool, on the plurality of said image data.

4. The method of measurement of tool dimensions according to claim 1, comprising a step of using the movement path and the center axial line of the tool as a basis to specify at least one of a cutting edge position and tool size of said tool using the contour of said tool.

5. A machine tool which captures an image of a tool which is mounted on a spindle and uses the obtained image data to measure dimensions of the tool on the machine, comprising:

an image sensor which captures an image of said tool which moves relatively along a predetermined feed direction at a plurality of positions to generate a plurality of image data of the positions of said movement; and a processor which specifies a contour of said tool at each of the plurality of image data and uses the specified plurality of contours as a basis to specify an angle between a movement path of the tool and a center axial line of the tool and which uses the movement path of the tool as a basis to specify an angle β between a planar coordinate system of two perpendicular axes which is set in a machine tool and a planar coordinate system of two perpendicular axes which is set in a field of view of said image capture device and is linked with the planar coordinate system of the machine tool, and which controls the machine tool so as to correct the angles α and β.

* * * * *